US010423299B2

(12) United States Patent
Jetha et al.

(10) Patent No.: US 10,423,299 B2
(45) Date of Patent: *Sep. 24, 2019

(54) MENU DISPLAY FOR A GRAPHICAL USER INTERFACE

(75) Inventors: Zeenat Jetha, Van Couver (CA); Johannes A. Jansen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1286 days.

This patent is subject to a terminal disclaimer.

(21) Appl. No.: 13/107,346

(22) Filed: May 13, 2011

(65) Prior Publication Data

US 2011/0214089 A1    Sep. 1, 2011

Related U.S. Application Data

(62) Division of application No. 09/649,677, filed on Aug. 28, 2000, now Pat. No. 7,966,575.

(30) Foreign Application Priority Data

Aug. 28, 1999   (GB) .................................. 9920327.5

(51) Int. Cl.
    *G06F 3/0482*   (2013.01)
(52) U.S. Cl.
    CPC ................................ *G06F 3/0482* (2013.01)
(58) Field of Classification Search
    CPC .................................................... G06F 3/0482
    USPC ........ 715/771, 775–788, 803, 806–810, 825,
              715/828, 836, 839, 841–848, 850–852,
              715/854, 976; 345/419–427, 473,
              345/649–653, 902
    See application file for complete search history.

(56) References Cited

U.S. PATENT DOCUMENTS

| 4,875,034 | A | * | 10/1989 | Brokenshire ...... H04N 13/0434 |
| | | | | 345/419 |
| 5,463,725 | A | | 10/1995 | Henckel |
| 5,485,197 | A | | 1/1996 | Hoarty |
| 5,621,906 | A | | 4/1997 | O'Neill |
| 5,664,128 | A | | 9/1997 | Bauer |
| 5,682,511 | A | | 10/1997 | Sposato |
| 5,724,492 | A | * | 3/1998 | Matthews, III ....... G06F 3/0482 |
| | | | | 345/419 |

(Continued)

FOREIGN PATENT DOCUMENTS

| EP | 0498082 A1 | 8/1992 |
| EP | 0767418 A1 | 9/1997 |

(Continued)

*Primary Examiner* — Doon Y Chow
*Assistant Examiner* — Wendy Nicholas

(57) ABSTRACT

Methods of providing a menu display for a GUI together with a computer program, a computer-readable storage medium and apparatus for the same. Methods include displaying a first menu in a rotatable window; and, in the event of a second menu being selected by a user, displaying the second menu in place of the first menu by rotating the window to reveal the second menu on the flipside of the window, wherein in a first mode the user is enabled to select the menu being displayed and not enabled to select an option in the selected menu, the user is enabled to switch to a second mode and in the second mode, the user is enabled to select an option in the selected menu and not enabled to select the menu being displayed.

16 Claims, 3 Drawing Sheets

(56) References Cited

U.S. PATENT DOCUMENTS

Figure 1:
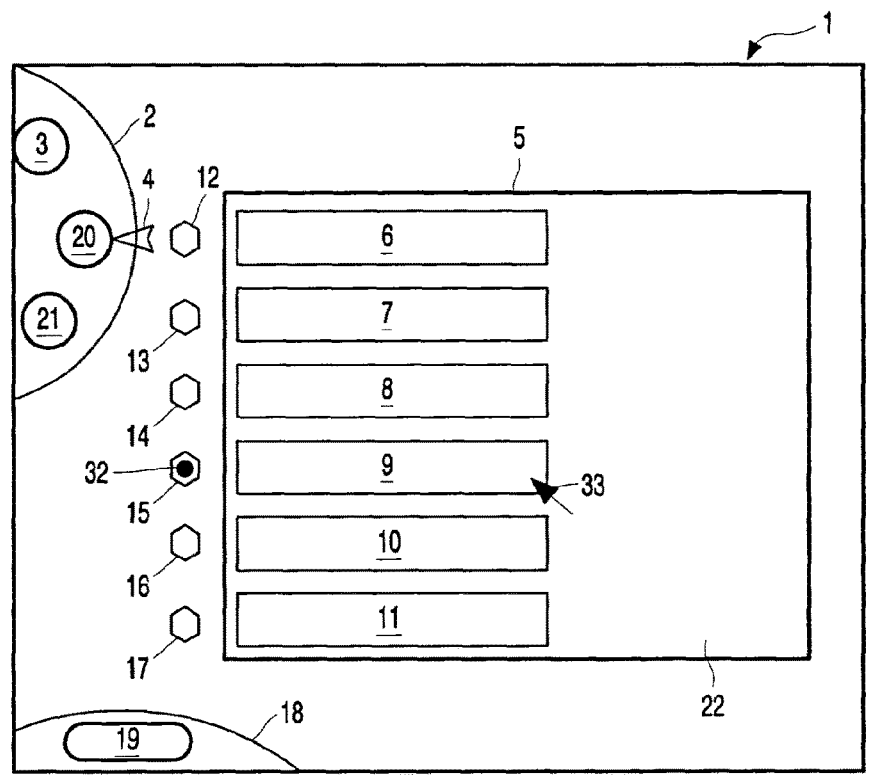

| | | | |
|---|---|---|---|
| 5,751,373 A | 5/1998 | Ohyama et al. | |
| 5,828,360 A | 10/1998 | Anderson | |
| 5,880,733 A * | 3/1999 | Horvitz | G06F 3/04815 345/427 |
| 5,940,076 A * | 8/1999 | Sommers | G06F 3/0482 715/834 |
| 5,953,007 A * | 9/1999 | Center | G06F 3/0481 715/764 |
| 6,115,724 A * | 9/2000 | Booker | G06F 3/0483 715/273 |
| 6,122,530 A * | 9/2000 | Overy et al. | 455/566 |
| 6,154,201 A * | 11/2000 | Levin | G01C 21/3664 345/156 |
| 6,297,795 B1 * | 10/2001 | Kato | G06F 1/1626 345/169 |
| 6,407,757 B1 * | 6/2002 | Ho | G06F 3/03547 715/702 |
| 6,519,003 B1 * | 2/2003 | Swayze | 348/375 |
| 6,538,635 B1 | 3/2003 | Ringot | |
| 6,549,219 B2 | 4/2003 | Selker | |
| 6,556,222 B1 | 4/2003 | Narayanaswami | |
| 6,577,330 B1 | 6/2003 | Tsuda | |
| 6,624,803 B1 * | 9/2003 | Vanderheiden et al. | 345/156 |
| 6,678,891 B1 | 1/2004 | Wilcox | |
| 6,680,749 B1 * | 1/2004 | Anderson | H04N 1/32128 348/231.99 |
| 6,822,662 B1 * | 11/2004 | Cook et al. | 715/788 |
| 7,225,413 B1 | 5/2007 | Kuenzner et al. | |

FOREIGN PATENT DOCUMENTS

| | | |
|---|---|---|
| EP | 0944218 A1 | 9/1999 |
| JP | H09134269 A | 5/1997 |
| JP | H10307674 A | 11/1998 |
| JP | H11110106 A | 4/1999 |
| WO | 9204801 A1 | 3/1992 |
| WO | 1996037996 A1 | 11/1996 |
| WO | 9717650 A1 | 5/1997 |
| WO | 9831116 A2 | 7/1998 |
| WO | 199828912 A1 | 7/1998 |
| WO | 9927435 A1 | 6/1999 |

* cited by examiner

MENU DISPLAY FOR A GRAPHICAL USER INTERFACE

This application is a Divisional of prior U.S. patent application Ser. No. 09/649,677, filed Aug. 28, 2000, which claims the benefit of Great Britain Application No. 9929327.5 filed Aug. 28, 1999, the entire contents of each of which is incorporated herein by reference thereto.

This invention relates to a method of providing a menu display for a graphical user interface (GUI) and to a computer program, a computer-readable storage medium and apparatus for the same.

As is well known, GUIs are used in many interactive applications in which a user is required on occasion to select one of a series of user selectable options. Such GUIs can be found in computer systems, televisions, automatic teller machines, games consoles and the like.

Complex interactive applications, say requiring multiple menu structures, mean that the corresponding GUI must be simple, efficient and flexible if the user is to be able to use such an application quickly and efficiently. This may be achieved to some extent by providing a menu display which is firstly suitable for interfacing with a simple, ergonomic input device and secondly by providing a menu display which is intuitive in its operation.

Known input devices such as mouses, trackballs, keyboards, remote control keypads and touch sensitive screens each have physical attributes which make them either more or less preferable to use with particular menu displays, and indeed vice versa. For example, in our European patent application EP 0498082 A1, a curved band of selectable icons associated with menu options is provided to correspond to the natural hand-movement of a user using a hand-held pointer interface.

With respect to intuitiveness, for the operation of a menu system to be intuitive, it should be capable of operating in a manner which lends itself to the vagaries of human behaviour and anticipation. Although perhaps less quantifiable than physiological factors, intuitiveness is nevertheless important, and perhaps more so in a menu display used only infrequently.

It is therefore an aim of the invention to provide a menu display for a GUI which is capable of being operated quickly and efficiently.

According to a first aspect of the present invention, a method of providing a menu display for a GUI comprises the steps of displaying a menu in the form of a group of icons wherein each icon corresponds to a menu option and is selectable by a user; displaying an icon selector graphic adapted to identify the icon corresponding to a menu option currently selected by a user; and displaying a textual label corresponding to the currently selected menu option wherein the group of icons and the icon selector graphic are rotatable relative to each other and in accordance with a user's input.

A menu display provided by a method according to the first aspect of the present invention is intuitive and suitable for interfacing with simple, ergonomic input apparatus. In addition, the textual labels provide a explicit reminder of the nature of a menu option having been selected using a non-explicit icon.

In a preferred method according to the first aspect of the present invention, the textual label corresponding to the currently selected option is one of a group of individual textual labels, each describing a different menu option.

In such a preferred method, the group of textual labels is ideally rotatable and, in particular, by appending the textual labels to a rotatable textual label carrier. During a user's change of selection of menu option, this enables the new textual label to be rotated into position in parallel with the rotation of the group of icons relative to the icon selector graphic. To further facilitate a smooth transition of textual labels during a user's change of menu option, the group of textual labels is preferably arranged in a curved fashion, for example, in a circle.

In order to provide a compact display, it is preferable that the centre of rotation of the textual labels is located outside the periphery of the display so that textual labels not in use are rotated off-screen. Also, in order to emphasise the textual label corresponding to the currently selected menu option, it is preferable that only one full text label is in view at any one time.

In accordance with the first aspect of the present invention, the group of icons and the icon selector graphic are rotatable relative to each other. Where the icon selector graphic is stationary and the group of icons is rotatable, the group of icons may be appended to a rotatable carrier. As with the textual labels above, in order to provide a compact display, the centre of rotation of the group of icons may be located outside the periphery of the display and at least one currently unselected icon may be out of view at any given time.

Again similarly to the group of textual labels, the group of icons may be arranged in a curved fashion such as a circle to enable a smooth transition during selection of a new icon/menu option.

According to a second aspect of the present invention, a method of providing a menu display for a GUI comprises the steps of displaying a primary menu in the form of a group of icons wherein each icon corresponds to a primary menu option and is selectable by a user; displaying an icon selector graphic adapted to identify the icon corresponding to a primary menu option currently selected by a user; displaying a submenu associated with the primary menu option current selected by the user; and, in the event of a new primary menu option being selected, displaying a new submenu associated with the new primary menu option, wherein the group of icons and the icon selector graphic are rotatable relative to each other in the plane of the menu display, and in accordance with a user's input. Such a menu display is intuitive and suitable for interfacing with simple, ergonomic input apparatus.

In a preferred embodiment according to the second aspect of the present invention, the submenu options are located on a rotatable window such that in the event of a new primary menu option being selected, the window is rotated, ideally rotated 180° or a multiple thereof, whereby the new submenu is revealed to be on the flip-side of the window. This enables a smooth transition between submenus which is both intuitive and relaxing to the eye.

In order to select a primary menu option, a user may, in a first mode of operation, rotate the group of icons relative to the icon selector graphic in either direction using first selection means and, in a second mode of operation, select a submenu option using the same first selection means in the same fashion. Switching between first and second modes of operation may be accomplished by a user using second selection means.

For example, in the first mode of operation, up and down cursor keys may be used to rotate the icon group in anti-clockwise and clockwise respectively, and in the second mode of operation, the up and down cursor keys may be used to scroll up and down through the submenu options. The switching between first and second modes of operation may be accomplished using left and right cursor keys, or a single toggle key. In addition to keys on a key pad, rocker switches, buttons and many other conventional input means would also be suitable as would be apparent to one of ordinary skill in the art.

With regard to the configuration of the group of icons and the icon selector graphic, the configurations as described above with respect to a method according to the first aspect of the present invention apply equally to a method according to a second of the present invention.

According to a third aspect of the present invention, a method of providing a menu display for a GUI comprises the steps of displaying a menu in the form of a group of icons, each icon corresponding to a menu option selectable by a user; and displaying a textual label corresponding to the currently selected menu option, wherein the textual label corresponding to the currently selected options is one of a rotatable group of textual labels, each textual label corresponding to a different menu option.

The group of textual labels may be appended to a rotatable textual label carrier and, for the reasons mentioned above, it is desirable that the centre of rotation of the textual labels is located outside the periphery of the display; that the group of textual labels is arranged in a curved fashion such as a circle; and that only one full text label is in view at any one time.

According to a fourth aspect of the present invention, a method of providing a menu display for a GUI comprises the steps of displaying a menu in the form of a group of icons wherein each icon corresponds to a menu option and is selectable by a user; and displaying an icon selector graphic adapted to identify the icon corresponding to a menu option currently selected by a user, wherein the icon selector graphic is stationary and the group of icons is rotatable relative to the icon selector graphic in accordance with a user's input; and wherein the centre of rotation of the group of icons is located outside the periphery of a display.

The group of icons may be appended to a rotatable carrier and at least one currently unselected icon may be out of view at any given time.

According to a fifth aspect of the present invention, a method of providing a menu display for a GUI comprises the steps of displaying a first menu in a rotatable window; and, in the event of a second menu being selected by a user, displaying the second menu in place of the first menu by rotating the window, ideally rotated 180° or a multiple thereof, to reveal the second menu on the flip-side of the window.

Also, during rotation, the illusion of perspective may be produced by shrinking the part of the window and its contents perceived to be behind the display and enlarging the part of the window and its contents perceived to be in front of the display wherein both the degree of shrinking and enlargement is related to the perceived distance of the part of the window and its contents from the display.

Figure 3:
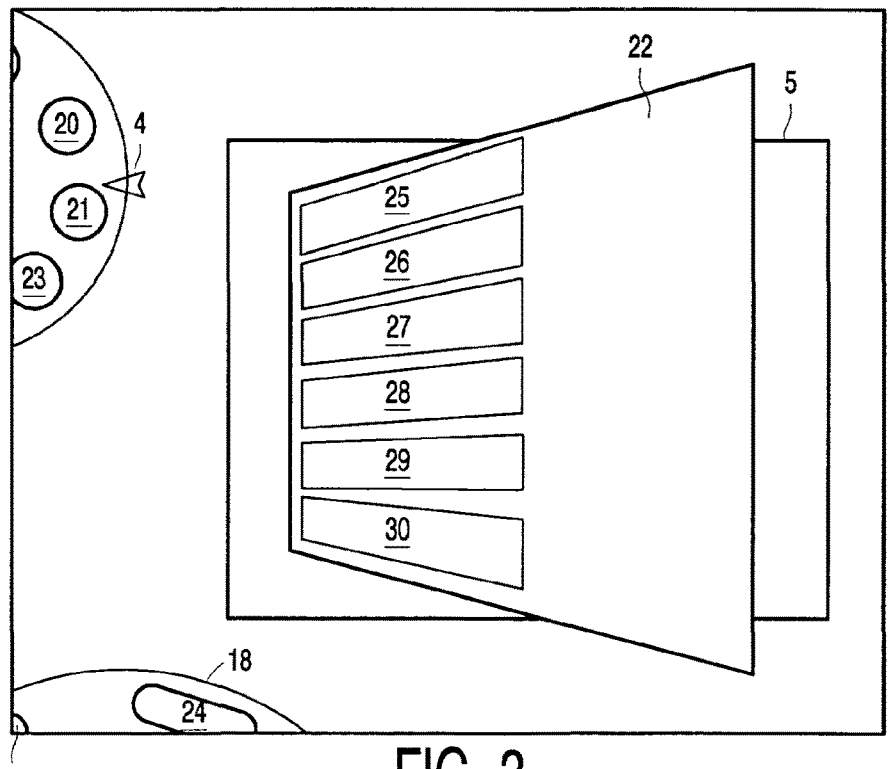
Figure 4:
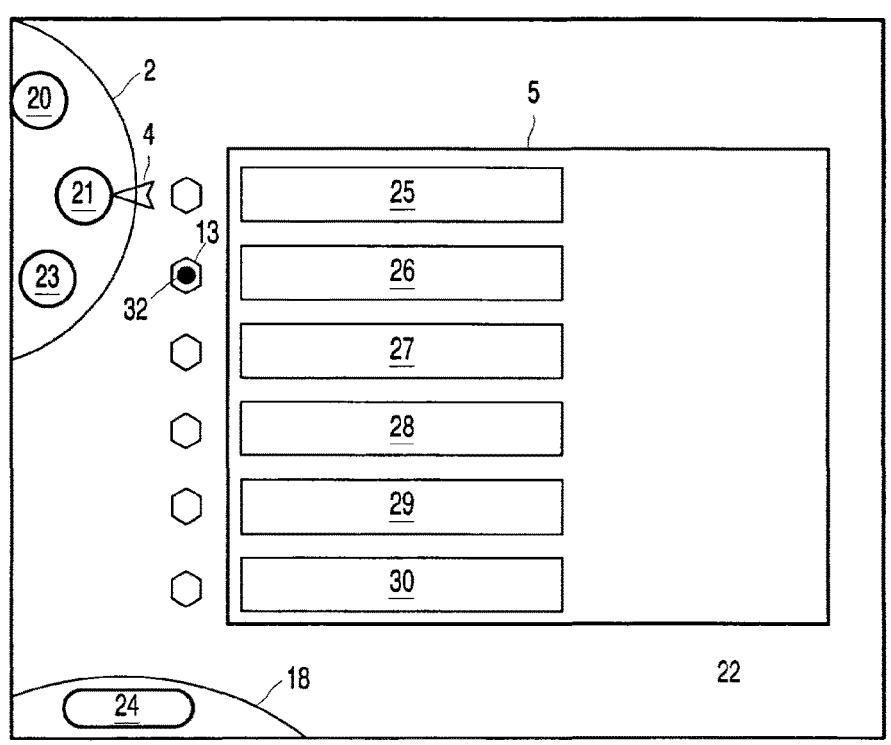
Figure 5:
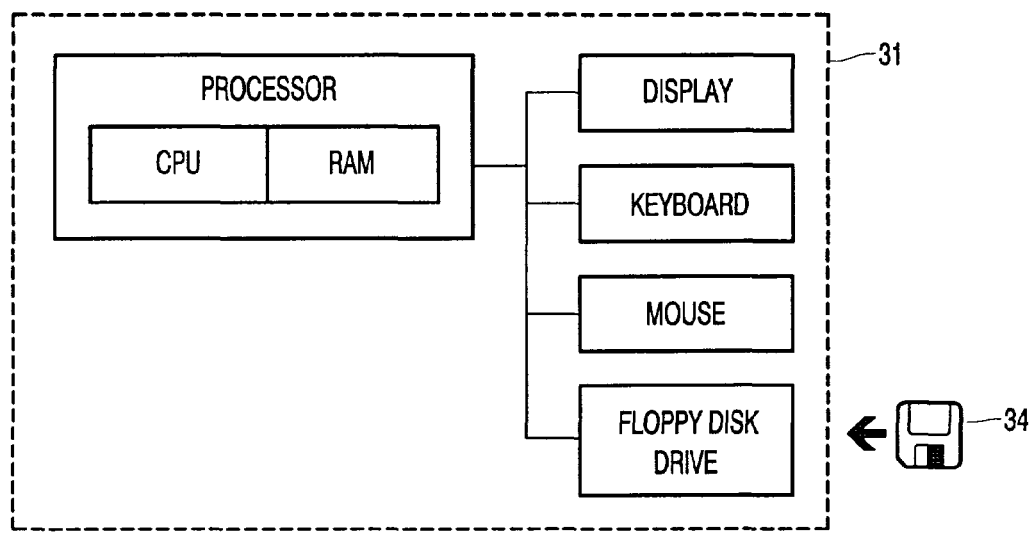

Embodiments of the present invention will now be described, by way of example only, with reference to the accompanying figures in which:

FIGS. 1 to 4 show a menu display for a GUI provided by a method in accordance with the present invention; and FIG. 5 shows, schematically, a computer system capable of implementing the menu display of FIGS. 1 to 4.

In FIG. 1, a menu display 1 is shown comprising a primary menu in the form of a rotatable icon wheel 2 positioned, partially in view, in the top left corner of the menu display. Seven icons corresponding to primary menu options are appended to the icon wheel, three being in view 3, 20, 21 with the remainder of the icons and the icon wheel being "located" off screen. A currently selected icon 20/primary menu option is indicated by reference to an icon selector graphic 4 located adjacent to the icon wheel. In order to select a different icon/primary menu option, a user may rotate the icon wheel either clockwise or anticlockwise by pressing appropriate keys on a keypad (not shown). Alternatively a trackball (not shown) or a mouse with a wheel selector (not shown) may be used to rotate the icon wheel by rotating the trackball or wheel accordingly.

The menu display 1 further comprises a rotatable feedback wheel 18 positioned in the bottom left corner of the menu display, again only partially in view. Seven text labels corresponding to the icons/primary menu options are appended to the feedback wheel with only full text label 19 in view at any one time. Similar to the icon wheel 2, the remainder of the text labels and the feedback wheel are "located" off screen. The feedback wheel rotates in parallel with the icon wheel whereby the text label in view describes the currently selected icon 20/primary menu option. For example, a "web" text label may be displayed when an icon depicting a networked computer is selected corresponding to a menu option to use the internet.

The menu display 1 further comprises a window 22 surrounded by a frame 5. In the window, a submenu is provided consisting of a group of text labels 6-11, each corresponding to a submenu option. The submenu options may include gateways to further submenus, links to user documents or external websites, or system controls such as volume up/down etc. Outside the window, 6 buttons 12-17 are located, each corresponding to an adjacent text label/submenu option. The submenu options may be selected in a variety of conventional ways; for example, by a user using a mouse (not shown) to position a display cursor 33 over a button or text label and clicking to select; or alternatively, by a user pressing appropriate keys on a keypad (not shown) to position an identifier 32 on the button 15 associated with the required submenu option, and then pressing a further key (not shown) to confirm the selection.

The submenu options associated with the text labels 6-11 in the window 22 are each related to the subject matter of the icon 20/primary menu option selected on the icon wheel. For example, if the selected icon relates to the web (say as before by depicting a networked computer), the text labels for the submenu options might include "web search", "on-line news", "favourite websites" etc.

In the event that a user selects a different icon/primary menu option, for example, an icon depicting a television, the original group of text labels corresponding to the original submenu options in the windows 6-11 is removed and replaced by a new group of text labels corresponding to new submenu options relating to television, for example, "sports", "news", "documentaries", "favourite shows", "TV set-up" etc.

Figure 2:
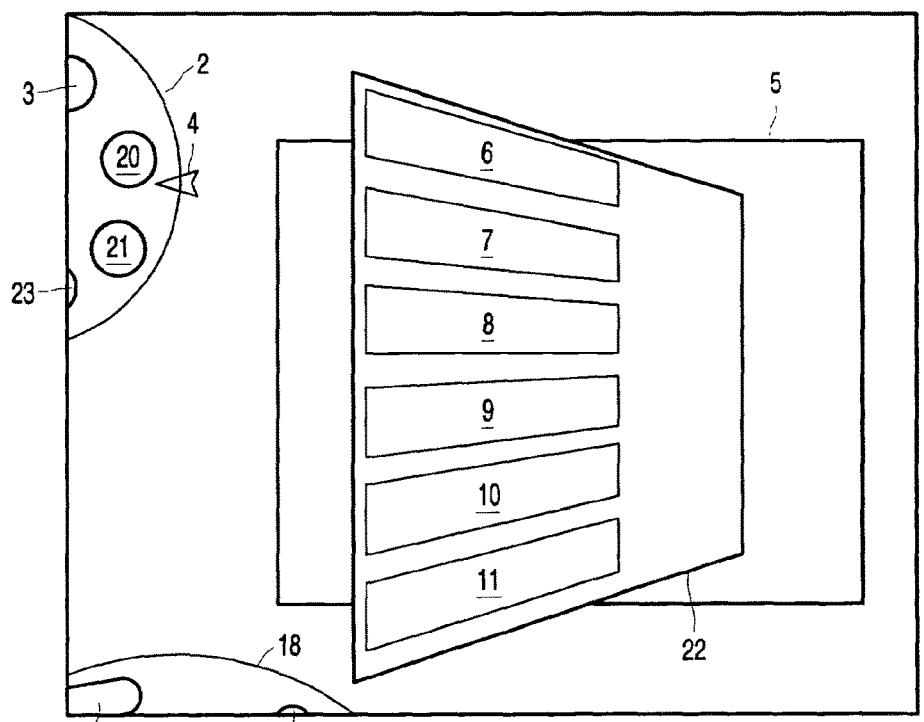

FIGS. 2 to 4 sequentially illustrate the changes in the menu display when a different icon/primary menu option is selected. The icons 3, 20, 21, 23 and the icon wheel 2 rotate during a user's new selection whereby the previously selected icon 20 moves away from the icon selector graphic 4 and is replaced by icon 21 corresponding to the newly selected primary menu option. As the view of the icon wheel is partial, icon 3 goes off the screen and icon 23 appears. Corresponding changes are made in the feedback wheel 18 in that old text label 19 is replaced by new text label 24 describing the newly selected icon/primary menu option.

In parallel, the window 22 rotates in the frame 5 about a vertical axis relative to the menu display 1 and in the plane of the menu display. The illusion of perspective during rotation is produced by shrinking the part of the window and its contents when "behind" the display and enlarging the part of the window and its contents when "in front" of the display and whereby both shrinking and enlargement are progressive relative to the perceived distance of the window and its contents from the display.

During rotation, the old group of text labels 6-11 which relate to the icon previously selected are removed from view and replaced by a new group of text labels 25-30 on the flip-side of the window 5.

The menu display may be manipulated by cursor keys on a keypad (not shown) wherein, in a first mode, up and down cursor keys are used to rotate the icon wheel 2 clockwise and anticlockwise respectively, and in a second mode, the same up and down cursor keys are used to position the identifier 32 on the required button. Switching between modes is accomplished by using left and right cursor keys; left to control the icon wheel and right to control the identifier. Alternatively, a toggle switch such as a single key may be used to toggle between first and second modes of operation.

A computer system 31 capable of implementing the above method is shown schematically in FIG. 5. The computer system comprises a processor having a central processing unit (CPU) and a random access memory (RAM). The computer system further comprises a display, keyboard, mouse and a floppy disk drive, all coupled to the processor in known manner. A floppy disk 34 is provided for the floppy disk drive having recorded thereon a computer program comprising instructions for performing a method according to the present invention. Alternatively, other types of computer-readable storage media and corresponding hardware may be used.

Implementation of a method according to the present invention in such a computer system may be readily accomplished in hardware, in software by appropriate computer programming and configuration or through a combination of both. Of course, such programming and configuration is well known and would be accomplished by one of ordinary skill in the art without undue burden. It would further understood by one of ordinary skill in the art that the teaching of the present invention applies equally to other types of apparatus having a GUI and not only to the aforementioned computer system.

The invention claimed is:

1. A method of providing a menu display for a GUI, the method comprising acts of:
displaying a first menu including a first plurality of selection options in a front side of a rotatable window covering a portion of the GUI and, in the event of a second menu being selected by a user, displaying the second menu including a second plurality of selection options in place of the first menu by rotating the window to reveal the second menu on a backside of the window positioned covering the covered portion of the GUI,
displaying a frame around the window and in the event of a new menu being selected, rotating the window around an axis of the displayed frame with the window extending beyond a border of the displayed frame during the rotation and being contained within the displayed frame after the rotation, wherein
in a first mode the user is enabled to select the menu being displayed and not enabled to select an option that is displayed in the selected menu,
the user is enabled to switch to a second mode, and
in the second mode the user is enabled to select an option in the selected menu and not enabled to select the menu being displayed.

2. The method according to claim 1, wherein the user is enabled to select the menu being displayed and the option in the selected menu by using the same selection means in the same fashion.

3. The method according to claim 2, wherein the user is enabled to switch between the first and the second mode by using further selection means.

4. The method according to claim 3, wherein the selection means comprises up and down cursor keys on a keypad and the further selection means comprises left and right cursor keys on a keypad.

5. The method according to claim 3, wherein the further selection means comprises a toggle switch for toggling between the first and second mode.

6. The method according to claim 1, wherein during the rotation, the window is rotated around a vertical axis of the displayed frame 180° without moving and without rotating the displayed frame.

7. The method according to claim 6, wherein during rotation, the illusion of perspective is produced by shrinking a part of the window and its content perceived to be behind the displayed frame while simultaneously enlarging a part of the window and its contents perceived to be in front of the displayed frame; and wherein both the degree of shrinking and enlargement is related to the perceived distance of the corresponding part of the window and its contents from the displayed frame.

8. Apparatus having a display, a processor and a user input device for providing a GUI menu display in accordance with claim 1.

9. A method of providing a menu display for a GUI, the method comprising acts of:
displaying on a screen a first menu including a first plurality of selection options in a front side of a rotatable window covering a portion of the GUI; and, in the event of a second menu being selected by a user, displaying the second menu including a second plurality of selection options in place of the first menu by rotating the window to reveal the second menu on a backside of the window positioned covering the covered portion of the GUI;
displaying in a visually rotatable portion of the screen that is intersected by at least one edge of the screen a textual label such that only the textual label that describes a currently displayed first or second menu is fully in view on the screen, wherein the textual label is from a group of textual labels that correspondingly describe pluralities of selection options including the first and second plurality of selection options;
in a first mode, enabling selection of a menu for display while disabling selection of a displayed option in the selected menu;
enabling switching between the first mode and a second mode; and
in the second mode, enabling selection of an option in the selected menu while disabling selection of the menu being displayed,
wherein in the event of the window rotating, the textual label is concurrently rotated.

10. The method according to claim 9, comprising an act of enabling selection of the menu being displayed and the option in the selected menu using the same selection means in the same fashion.

11. The method according to claim 10, comprising an act of enabling switching between the first and the second mode by further selection means.

12. The method according to claim 11, wherein the selection means comprises up and down cursor keys on a keypad and the further selection means comprises left and right cursor keys on a keypad.

13. The method according to claim 11, wherein the further selection means comprises a toggle switch for toggling between the first and second mode.

14. The method according to claim 9, comprising acts of displaying a frame around the window and in the event of a new menu being selected, rotating the window around a vertical axis of the displayed frame 180° with the window extending beyond a border of the displayed frame during the rotation and being contained within the displayed frame after the rotation without moving and without rotating the displayed frame.

15. The method according to claim 14, wherein during rotation, the illusion of perspective is produced by shrinking a part of the window and its content perceived to be behind the displayed frame while simultaneously enlarging a part of the window and its contents perceived to be in front of the displayed frame; and wherein both the degree of shrinking and enlargement is related to the perceived distance of the corresponding part of the window and its contents from the displayed frame.

16. Apparatus having a display, a processor and a user input device for providing a GUI menu display in accordance with claim 9.

* * * * *